(12) United States Patent
Alavi (10) Patent No.: US 9,611,350 B2
(45) Date of Patent: Apr. 4, 2017

(54) FORMALDEHYDE-FREE MELAMINE CARBOHYDRATE BINDERS FOR IMPROVED FIRE-RESISTANT FIBROUS MATERIALS

(71) Applicant: JOHNS MANVILLE, Denver, CO (US)

(72) Inventor: Kiarash Alavi, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

(21) Appl. No.: 15/237,949

(22) Filed: Aug. 16, 2016

(65) Prior Publication Data

US 2016/0362514 A1 Dec. 15, 2016

Related U.S. Application Data

(62) Division of application No. 14/323,199, filed on Jul. 3, 2014, now Pat. No. 9,447,221.

(51) Int. Cl.
*C08G 16/02* (2006.01)
*C08J 5/04* (2006.01)

(52) U.S. Cl.
CPC .......... *C08G 16/0256* (2013.01); *C08J 5/043* (2013.01); *C08J 2361/00* (2013.01)

(58) Field of Classification Search
None
See application file for complete search history.

(56) References Cited

U.S. PATENT DOCUMENTS

| | | |
|---|---|---|
| 3,645,841 A | 2/1972 | Cabestany et al. |
| 4,345,063 A | 8/1982 | North |
| 4,699,824 A | 10/1987 | Pufahl |
| 5,030,685 A | 7/1991 | Doi et al. |
| 5,539,077 A | 7/1996 | Floyd |
| 5,665,851 A | 9/1997 | Wilhelm et al. |
| 6,890,635 B2 | 5/2005 | Lin et al. |
| 7,169,881 B2 | 1/2007 | Hopkins et al. |
| 2001/0051720 A1 | 12/2001 | Waldmann |
| 2007/0027283 A1 | 2/2007 | Swift et al. |
| 2007/0082187 A1 | 4/2007 | Wang et al. |
| 2011/0040010 A1 | 2/2011 | Shooshtari |
| 2013/0327250 A1 | 12/2013 | Shooshtari |

FOREIGN PATENT DOCUMENTS

| | | |
|---|---|---|
| EP | 1 652 868 A1 | 5/2006 |
| GB | 2 191 207 A | 12/1987 |
| GB | 2 451 719 A | 11/2009 |

*Primary Examiner* — Vickey Nerangis
(74) *Attorney, Agent, or Firm* — Robert D. Touslee (57) ABSTRACT

Embodiments of the present technology include a formaldehyde-free binder composition. The composition may include melamine. The composition may also include a reducing sugar. In addition, the binder composition may include a non-carbohydrate aldehyde or ketone. Embodiments may also include a method of making a formaldehyde-free binder composition. The method may include dissolving melamine in an aqueous solution of a reducing sugar. The concentration of the reducing sugar may be 30 wt. % to 70 wt. % of the aqueous solution, which may be at a temperature of 50° C. to 100° C. The method may also include adding a non-carbohydrate aldehyde or ketone to the dissolved melamine in the aqueous solution to form a binder solution. The temperature of the aqueous solution of the dissolved melamine may be 50° C. to 100° C. during the addition of the non-carbohydrate aldehyde or ketone. The method may further include reducing the temperature of the binder solution.

10 Claims, 6 Drawing Sheets

FORMALDEHYDE-FREE MELAMINE CARBOHYDRATE BINDERS FOR IMPROVED FIRE-RESISTANT FIBROUS MATERIALS

CROSS-REFERENCES TO RELATED APPLICATIONS

This application is a divisional of U.S. application Ser. No. 14/323,199 filed Jul. 3, 2014.

BACKGROUND

Organic binders for composite fiber products such as fiberglass insulation are moving away from traditional formaldehyde-based compositions. Formaldehyde is considered a probable human carcinogen, as well as an irritant and allergen, and its use is increasingly restricted in building products, textiles, upholstery, and other materials. In response, binder compositions have been developed that reduce or eliminate formaldehyde from the binder composition.

One type of these formaldehyde-free binder compositions rely on esterification reactions between carboxylic acid groups in polycarboxy polymers and hydroxyl groups in alcohols. Water is the main byproduct of these covalently crosslinked esters, which makes these binders more environmentally benign, as compared to traditional formaldehyde-based binders. However, these formaldehyde-free binder compositions also make extensive use of non-renewable, petroleum-based ingredients. Thus, there is a need for formaldehyde-free binder compositions that rely less on petroleum-based ingredients.

As an abundant and renewable material, carbohydrates have great potential to be an alternative to petroleum-based binders. Carbohydrates are already used as a component of some types for binders, such as Maillard binders that contain reaction products of reducing sugar carbohydrates and amine reactants. Although these products may have acceptable thermal and mechanical properties for low density fiber glass products, their fire resistance is typically lower than formaldehyde containing resins for pipe insulation and other high density fiberglass-based products. Thus, there is a need to improve the fire resistance of carbohydrate-containing binder compositions. These and other issues are addressed in the present Application.

BRIEF SUMMARY

Formaldehyde-free binder compositions that may include water-soluble melamine are described. Such binder compositions may be non-hazardous and may not generate formaldehyde, and the melamine in the binder may improve the fire and flame resistance of the binder. These binders may often include renewable components, such as reducing sugars. These binders may be used in fiber-reinforced composites. Methods of making these binder compositions and these fiber-reinforced composites are also described.

Embodiments of the present technology include a formaldehyde-free binder composition. The composition may include melamine. The composition may also include a reducing sugar. In addition, the binder composition may include a non-carbohydrate aldehyde or ketone.

Embodiments may also include a method of making a formaldehyde-free binder composition. The method may include dissolving melamine in an aqueous solution of a reducing sugar. The concentration of the reducing sugar may be 30 wt. % to 70 wt. % of the aqueous solution, which may be at a temperature of 50° C. to 100° C. The method may also include adding a non-carbohydrate aldehyde or ketone to the dissolved melamine in the aqueous solution to form a binder solution. The temperature of the aqueous solution of the dissolved melamine may be 50° C. to 100° C. during the addition of the non-carbohydrate aldehyde or ketone. The method may further include reducing the temperature of the binder solution to about 23° C.

Embodiments may include a fiber-reinforced composite. The fiber-reinforced composite may include a plurality of fibers and a binder made from a formaldehyde-free binder composition. The binder may include melamine, and the binder may include a reducing sugar. In addition, the binder may include a non-carbohydrate aldehyde or ketone. The binder may further include a curing catalyst.

Embodiments may further include a method of making a fiber-reinforced composite. The method may include providing a plurality of fibers. An operation in the method may include contacting the plurality of fibers with a formaldehyde-free binder composition to make a fiber-binder amalgam. The formaldehyde-free binder composition may include melamine, and the binder composition may also include a reducing sugar. Furthermore, the binder composition may include a non-carbohydrate aldehyde or ketone. Additionally, the binder composition may include a curing catalyst. The method may also include heating the fiber-binder amalgam to a temperature of 100° C. to 250° C. to form the fiber-reinforced composite.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION

Melamine and its salts, which include phosphate, sulfate, and borate, are known fire retardants. These salts, however, are generally not soluble in water and thus may not be used in an aqueous solution to improve the fire resistance of formaldehyde-free resins. Moreover, while melamine resins may be used with formaldehyde-free resins to improve fire resistance, these melamine resins may either contain formaldehyde or have low or limited solubility in water. Additionally, some formaldehyde-free melamine resins may not include renewable raw materials. Melamine binders may also not have been used to bind mineral or glass fibers.

Melamine as described herein may be water soluble and part of a formaldehyde-free binder composition for binding mineral or glass fibers. Although melamine typically has limited solubility in water, melamine was found to dissolve in a 30% to 70% solution of sugars (e.g., dextrose) at a temperature of 50° C. to 100° C. Still, when the temperature of the solution was cooled to room temperature, the solution was observed to precipitate melamine and to result in hard-settling of melamine. Adding a small amount of glyoxal to the hot solution of melamine and sugars was observed to prevent the precipitation of melamine when the solution was cooled to room temperature. Without intending to be bound by any particular theory, it is believed that melamine may have reacted with glyoxal and the resulting adduct may have been soluble in the sugar solution. The solubility of melamine in water may be accomplished without the aid of a charged moiety or a quaternization agent.

The binder compositions may include a melamine compound, which may be a substituted or unsubstituted melamine having the formula:

where $R_1$, $R_2$, $R_3$, $R_4$, $R_5$, and $R_6$ are independently chosen from a hydrogen moiety (H), an alkyl group, an aromatic group, an alcohol group, an aldehyde group, a ketone group, a carboxylic acid group, and an alkoxy group. Exemplary alkyl groups include straight-chained, branched, or cyclic hydrocarbons of varying size (e.g., $C_1$-$C_{12}$, $C_1$-$C_8$, $C_1$-$C_4$, etc.). Exemplary aromatic (i.e., aryl) groups include substituted or unsubstituted phenyl moieties, among other aromatic constituents. Exemplary alcohol groups include —ROH, where R may be a substituted or unsubstituted, saturated or unsaturated, branched or unbranched, cyclic or acyclic, organic moiety. For example, R may be —$(CH_2)_n$—, where n may be 1 to 12. Exemplary alcohols may also include polyols having two or more hydroxyl groups (—OH) in alcohol group. Exemplary aldehyde groups include —RC(=O)H, where R may be a monovalent functional group (e.g., a single bond), or a substituted or unsubstituted, saturated or unsaturated, branched or unbranched, cyclic or acyclic, organic moiety, such as —$(CH_2)_n$—, where n may be 1 to 12. Exemplary ketone groups may include —RC(=O)R' where R and R' can be variety of carbon containing constituents. Exemplary carboxylic acid groups may include —R—COOH, where R may be a monovalent functional group, such as a single bond, or a variety of carbon-containing constituents. Exemplary alkoxy groups include —$OR_x$, where $R_x$ is an alkyl group.

Embodiments of the present technology include a formaldehyde-free binder composition. The composition may include a melamine compound, such as substituted or unsubstituted melamine. The composition may also include a reducing sugar. The mole or molar ratio of the melamine compound to the reducing sugar may be from 1:3 to 1:12, 1:5 to 1:10, or 1:7 to 1:9 in embodiments.

The reducing sugar may be any sugar having an aldehyde group, or a ketone group that is capable of isomerizing to produce an aldehyde group. Exemplary reducing sugars include monosaccharaides such as glucoses (e.g., dextrose), fructose, glyceraldehyde, and galactose. They also include polysaccharaides such as lactose, maltose, xylose, and amylose, among others. The reducing sugar may include high fructose corn syrup. The binder compositions may include a single reducing sugar or a combination of two or more reducing sugars as the reducing sugars in the composition.

In addition, the binder composition may include a compound with an aldehyde or ketone. This aldehyde- or ketone-containing compound may be a compound that is not the reducing sugar. The compound may be a non-carbohydrate. Examples of non-carbohydrate ketones may include acetone, methyl ethyl ketone, and pentanedione.

The aldehyde-containing compound may contain one or more aldehyde functional groups. Exemplary aldehyde-containing compounds include acetaldehyde, propanaldehyde, butyraldehyde, acrolein, furfural, glyoxal, gluteraldehyde, alkoxylated acetaldehyde, glutaric dialdehyde, and polyfurfural among others. Exemplary aldehyde-containing compounds may also include substituted glyoxal compounds having the formula:

where $R_7$ and $R_8$ may be independently hydrogen (H), an alkyl group, an aromatic group, an alcohol group, an aldehyde group, a ketone group, a carboxylic acid group, and an alkoxy group, among other groups. Aldehydes may be more effective than ketones in increasing the solubility of the melamine resin in reducing sugars. The only aldehydes or ketones present in the composition may be limited to those in the reducing sugar, the aldehyde- or ketone-containing compound, and the substituted melamine.

The ratio of melamine to the aldehyde-containing compound may be 2:1 or a mole ratio with a greater amount of aldehyde-containing compound. For example, the ratio of the melamine compound to glyoxal may be from 2:1 to 1:10, 2:1 to 1:5, 2:1 to 1:3, or 2:1 to 1:2. The mole ratio of the melamine compound:non-carbonhydrate aldehyde or ketone:reducing sugar may be from 1:0.5:6 to 1:0.5:12. For example, the mole ratio of melamine:non-carbonhydrate aldehyde or ketone:reducing sugar may be from 1:0.5:8 to 1:0.5:10.

The binder composition may further include a curing catalyst. Exemplary catalysts may include alkaline catalysts and acidic catalysts. The acidic catalysts may include Lewis acids (including latent acids and metallic salts), as well as protic acids, among other types of acid catalysts, including Brønsted acid catalysts. Lewis acid catalysts may be a salt of a deprotonized anion such as a sulfate, sulfite, nitrate, nitrite, phosphate, halide, or oxyhalide anion in combination with one or more metallic cations such as aluminum, zinc, iron, copper, magnesium, tin, zirconium, and titanium. Exemplary Lewis acid catalysts include aluminum sulfate, ferric sulfate, aluminum chloride, ferric chloride, aluminum phosphate, ferric phosphate, and sodium hypophosphite (SHP), among others. Exemplary latent acids include acid salts such as ammonium sulfate, ammonium hydrogen sulfate, mono and dibasic ammonium phosphate, ammonium chloride, and ammonium nitrate, among other latent acid catalysts. The curing catalyst may be a sulfate salt, a phosphate salt, a borate salt, or combinations thereof. The sulfate salt, the phosphate salt, or the borate salt may include an ammonium salt. Exemplary metallic salts may include organo-titanates and organo-zirconates (such as those commercially manufactured under the tradename Tyzor® by DuPont), organo-tin, and organo-aluminum salts, among other types of metallic salts. Exemplary protic acids include sulfuric acid, phosphoric acid, hydrochloric acid, nitric acid, sulfonic acid compounds (i.e., $R-S(=O)_2-OH$) such as p-toluenesulfonic acid and methanesulfonic acid, and carboxylic acids, among other protic acids. Catalyst compositions may also include combinations of two or more catalysts, for example the combination of ammonium sulfate and diammonium phosphate.

Exemplary concentrations of the catalyst (or combination of catalysts) in the binder composition may have a range from about 1 wt. % to about 20 wt. % of the composition. For example, the catalyst concentration may range from about 1%, 2%, 3%, 4%, 5%, 6%, 7%, etc., on the low end, and 10%, 11%, 12%, 13%, 14%, 15%, 16%, 17%, 18%, 19%, or 20 wt. % on the high end. Exemplary catalyst concentrations may include about 5 wt. %, about 7.5 wt. %, about 8 wt. %, about 9 wt. %, and about 10 wt. %, among other concentrations.

The binder may further include a melamine salt formed by the reaction of the melamine with the curing catalyst in the binder composition. The curing catalyst may act as a reaction catalyst even though it has reacted with melamine. The melamine salt may improve the fire resistance of the binder. A reaction with either the melamine or glyoxal as reactants may not result in a compound with an acidic moiety.

The pH of the present binder compositions may vary depending upon the types and relative concentrations of the components used. Typically the pH of the present binder compositions are slightly acidic to alkaline with a pH range of about 6 to 8 (e.g., 6.5 to 7.5). The binder compositions may have a pH that creates relatively little or no acid-based corrosion of metal fabrication equipment.

The binder composition may further include one or more additional components such as adhesion prompters, oxygen scavengers, solvents, emulsifiers, pigments, organic and/or inorganic fillers, anti-migration aids, coalescent aids, wetting agents, biocides, plasticizers, organosilanes, anti-foaming agents, colorants, waxes, suspending agents, anti-oxidants, and secondary crosslinkers, among other components. Compounds such as urea, Dicy, and guanidine may be included in the binder composition to further improve its fire resistance. Soluble or insoluble (dispersion) fire retardants may be added. Such fire retardants may include melamine salts, phosphates, borates, halogenated compounds, and hydrated compounds. In some instances, some or all of the additional components are pre-mixed with the binder composition before it is applied to fibers and cured. In additional instances, some or all of the additional components may be introduced to the curable, curing, and/or cured fiber-containing composite during or after the initial binder composition is applied to the fibers. In these or other instances, the binder composition may be free of cellulose.

Figure 1:
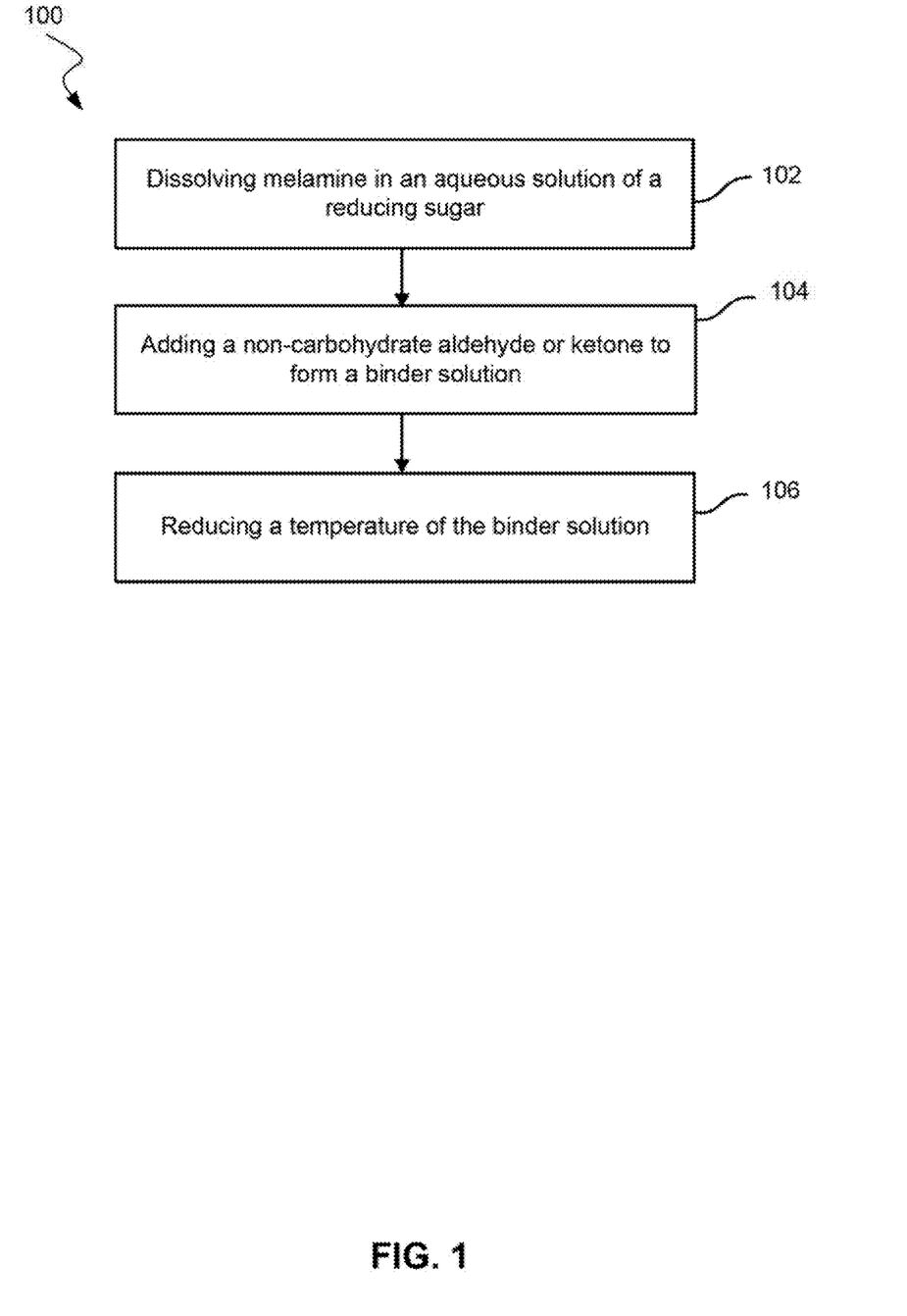
FIG. 1 shows a method of making a binder composition according to embodiments of the present technology.

Embodiments may also include a method of making a formaldehyde-free binder composition. FIG. 1 shows one such method 100 of making a formaldehyde-free binder composition. Method 100 may include dissolving a melamine compound, such as unsubstituted melamine, in an aqueous solution of a reducing sugar 102. The concentration of the reducing sugar may be 30 wt. % to 70 wt. % of the aqueous solution. For example, the concentration of the reducing sugar may be 40 wt. % to 60 wt. % or 45 wt. % to 55 wt. %. The aqueous solution may be at a temperature of 50° C. to 100° C. The reducing sugar may be any of the reducing sugars disclosed herein. Melamine may be dissolved in any of the mole ratios of melamine to the reducing sugar described herein.

Method 100 may also include adding a non-carbohydrate aldehyde or ketone to the dissolved melamine in the aqueous solution to form a binder solution 104. The temperature of the aqueous solution of the dissolved melamine may be 50° C. to 100° C. during the addition of the non-carbohydrate aldehyde or ketone. The non-carbohydrate aldehyde or ketone may be any of the non-carbohydrate aldehydes or ketones described herein. The mole ratio of melamine to the non-carbohydrate aldehyde or ketone may be any ratio disclosed herein.

The reaction product of melamine and the aldehyde- or ketone-containing compound may act as a crosslinking agent for the reducing sugar. During a curing stage the crosslinking agent can bond to two or more reducing sugars (either polymerized or unpolymerized) to form a cross-linked, polymeric cured binder.

After adding all of the non-carbohydrate aldehyde or ketone, the method may further include maintaining a temperature of the binder solution at 80° C. to 100° C. for about 60 minutes to 120 minutes. The method may further include adding a curing catalyst to the binder solution. The curing catalyst may be any of the compounds previously described. The addition of the curing catalyst may include adding a 10 wt. % aqueous solution of ammonium sulfate, diammonium phosphate, or a combination of ammonium sulfate and diammonium phosphate in a 1:1 ratio.

Method 100 may further include reducing the temperature of the binder solution 106 to about 23° C. At this temperature, the binder solution produced by method 100 may not precipitate melamine.

Embodiments may include a fiber-reinforced composite. The fiber-reinforced composite may include a plurality of fibers and a binder made from a formaldehyde-free binder composition. The binder composition may be any binder composition disclosed herein. The fiber-containing composites may include woven or non-woven fibers bound together by a cured matrix of the binder. The plurality of fibers in the composite may include one or more types of fibers chosen from glass fibers, carbon fibers, mineral fibers, and organic polymer fibers, among other kinds for fibers. At the conclusion of the curing stage, the cured binder may be present as a secure coating on the fiber mat at a concentration of approximately 0.5 to 50 percent by weight of the composition, for example the cured binder may be present at a concentration of approximately 1 to 10 percent by weight of the composition.

The fiber-containing composites may take a variety of forms, for example construction materials including piping insulation, duct boards (e.g., air duct boards), and building insulation, reinforcement scrim, and roofing membranes, among other construction materials. Additional examples may include loose-fill blown insulation, duct liner, duct wrap, flexible duct media, pipe insulation, tank insulation, rigid plenum liner, textile duct liner insulation, equipment liner, oven insulation, elevated temperature board, elevated temperature wrap, elevated temperature panel, insulation batts and rolls, heavy density batt insulation, light density batt insulation, exterior foundation insulation board, and marine hull insulation, among other materials. The composites can also find use in printed circuit boards, battery separators, and filter stock, among other applications.

Figure 2:
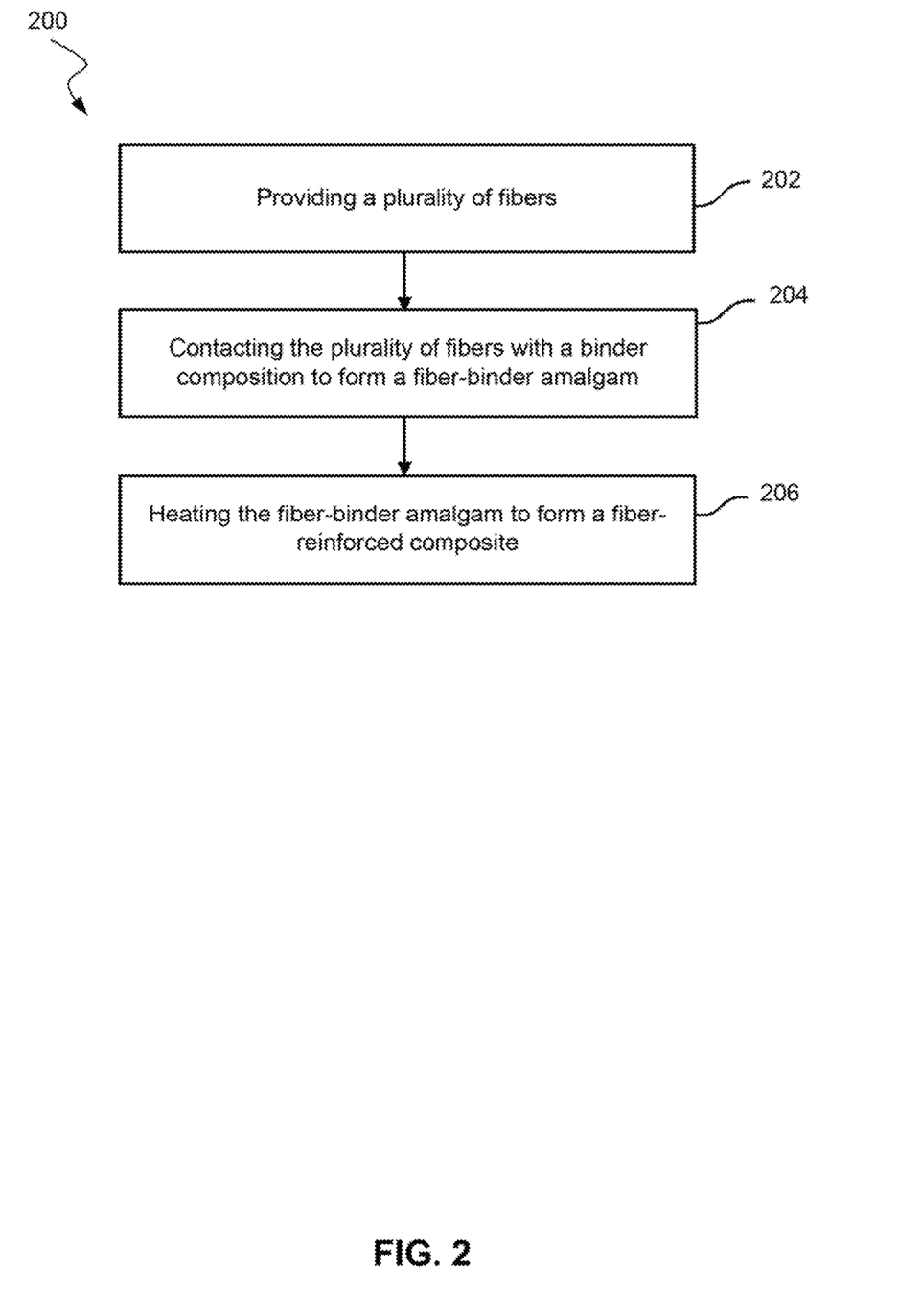
FIG. 2 shows a method of making a fiber-reinforced composite according to embodiments of the present technology.

As shown in FIG. 2, embodiments may further include a method 200 of making a fiber-reinforced composite. Method 200 may include providing a plurality of fibers 202. The plurality of fibers may include glass fibers or any of the fibers described herein. An operation in method 200 may include contacting the plurality of fibers with a formaldehyde-free binder composition to make a fiber-binder amalgam 204. The formaldehyde-free binder composition may be any binder composition described herein.

The step of contacting the binder composition to the fibers may be done by a variety of techniques including spraying, spin-curtain coating, curtain coating, and dipping-roll coating. The composition can be applied to freshly-formed fibers, or to fibers that have been cooled and processed (e.g., cut, coated, sized, etc.). The binder may be provided to the applicator as a premixed composition or may be supplied to the applicator in separate solutions for the crosslinking agent and the reducing sugar component. In some instances where the binder composition includes a solvent, a portion or all of the solvent may be removed from the composition before or after its application on the fibers.

Method 200 may also include heating the fiber-binder amalgam to a temperature of 100° C. to 250° C. to form the fiber-reinforced composite 206. For example, the fiber-binder amalgam may be heated to a temperature of 150° C. to 200° C. to form the fiber-reinforced composite. The amalgam may be heated to the curing temperature for a period of 1 minute to 100 minutes (e.g., 20 minutes to 80 minutes, 40 minutes to 60 minutes, and 20 minutes).

The curing step may produce the finished fiber-containing composite, such as fiberglass insulation. In some exemplary methods, additional agents like an anti-dusting agent may be applied during or following the curing step.

Figure 3:
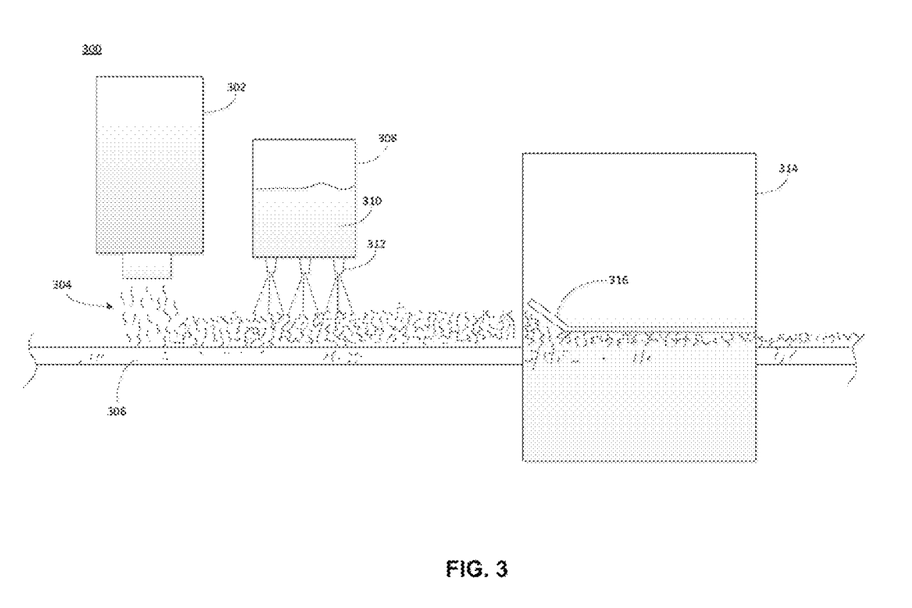
FIG. 3 depicts a simplified schematic of an exemplary fabrication system for making the fiber-containing composites according to embodiments of the present technology.

FIG. 3 shows a simplified schematic of an exemplary fabrication system 300 for making the fiber-containing composites described above. The system 300 includes fiber supply unit 302 that supplies the fibers for the composite. The fiber supply unit 302 may be filled with pre-made fibers, or may include equipment for making the fibers from starting materials such as molten glass or organic polymers. The fiber supply unit 302 deposits the fibers 304 onto a porous conveyor belt 306 that transports the fibers under the binder supply unit 308.

The binder supply unit 308 contains a liquid uncured binder composition 310, that is deposited onto the fibers 304. In the embodiment shown, the binder composition 310 is spray coated onto the fibers 304 with spray nozzles 312, however, other application techniques (e.g., curtain coating, dip coating, etc.) may be used in addition to (or in lieu of) the spray coating technique illustrated by nozzles 312.

The binder composition 310 applied on fibers 304 forms a fiber and binder amalgam on the top surface of the conveyor belt 306. The belt 306 may be perforated and/or porous to allow excess binder composition 310 to pass through the belt 306 to a collection unit (not shown) below. The collection unit may include filters and circulation pumps to recycle at least a portion of the excess binder back to the binder supply unit 308.

The conveyor belt 306 transports the amalgam to an oven 314 where it is heated to a curing temperature and the binder composition starts to cure. The temperature of the oven 314 and the speed of the conveyor belt 306 can be adjusted to control the curing time and temperature of the amalgam. In some instances, process conditions may be set to completely cure the amalgam into the fiber-containing composite. In additional instances, process conditions may be set to partially cure the amalgam into a B-staged composite.

The amalgam may also be compressed prior to or during the curing stage. System 300 shows an amalgam being compressed by passing under a plate 316 that tapers downward to decrease the vertical space available to the curing amalgam. The amalgam emerges from under the plate 316 in a compressed state and has less thickness than when it first made contact with the plate. The taper angle formed between the plate 316 and conveyor belt 306 can be adjusted to adjust the level of compression placed on the amalgam. The partially or fully cured composite that emerges from under plate 316 can be used for a variety of applications, including construction materials such as pipe, duct, and/or wall insulation, among other applications.

EXAMPLE 1

Melamine powder was added to and dispersed in a 50% solution of dextrose in water at ambient temperature in a three neck reactor equipped with a stirrer and condenser. The mole ratio of unsubstituted melamine to dextrose was varied from 1:3 to 1:12. The temperature was raised until the melamine dissolved completely, and a clear solution was obtained. The dissolution temperature of melamine was observed at a temperature of 100° C. for the 1:3 melamine:dextrose solution and 65° C. for the 1:12 melamine:dextrose solution.

Heating of the solution was stopped. A 40% solution of glyoxal in water was added to the hot melamine/dextrose solution. The mole ratio of of melamine to glyoxal varied from 1:0.5 to 1:3. After the addition of glyoxal, an exotherm was observed. This exotherm may indicate that the melamine reacts with the glyoxal.

The solution was a pale straw color. The solution was allowed to reach ambient temperature. The solutions were catalyzed with either a 10% (by dry mass) ammonium sulfate (AS), diammonium phosphate (DAP), or a 1:1 mixture of AS and DAP. Glass composites were manufactured with these binders and the mechanical properties were evaluated. Dynamic Mechanical Analysis (DMA) indicated the cure of the resin started at around 150° C. and was completed by 190° C. Results of these evaluations are described below.

EXAMPLE 2

Figure 4:
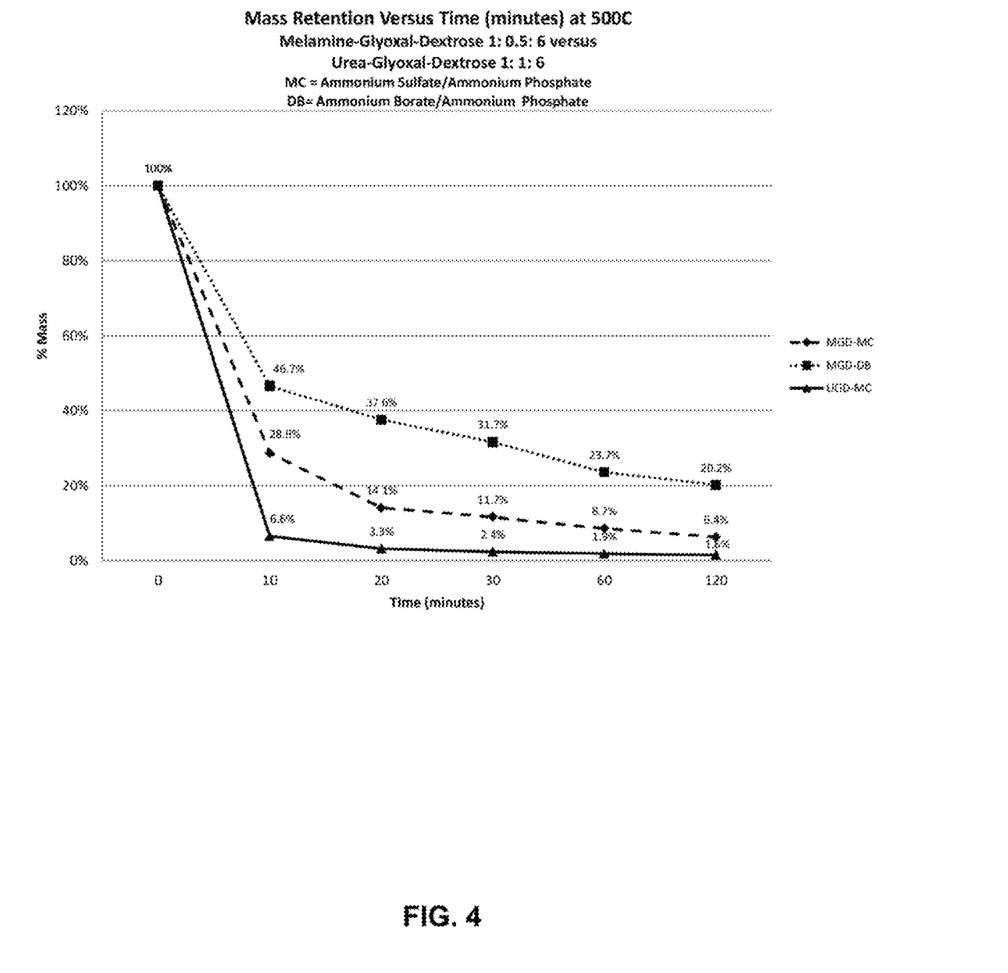
FIG. 4 shows a graph of mass retention at 500° C. versus time for different binders according to embodiments of the present technology.

Fire resistance of the binders of Example 1 was evaluated using a flame penetration method against other carbohydrate-based binders used in building insulation. FIG. 4 shows the mass retention at 500° C. versus time of a melamine-glyoxal-dextrose compared to urea-glyoxal-dextrose. The melamine-glyoxal-dextrose was tested with two different catalysts: ammonium sulfate/ammonium phosphate and ammonium borate/ammonium phosphate. Higher mass retention indicated higher thermal resistance. The melamine-glyoxal-dextrose binders showed superior performance.

EXAMPLE 3

The procedure of Example 1 is repeated except that after the addition of glyoxal, the resin was kept at 80° C. to 100° C. for 60 to 120 minutes. The resulting clear dark brown resin remained clear when kept at 0° C. for 120 days. This example shows that the long-term solubility of the resin can be improved if the resin remains heated after addition of glyoxal.

EXAMPLE 4

Figure 5:
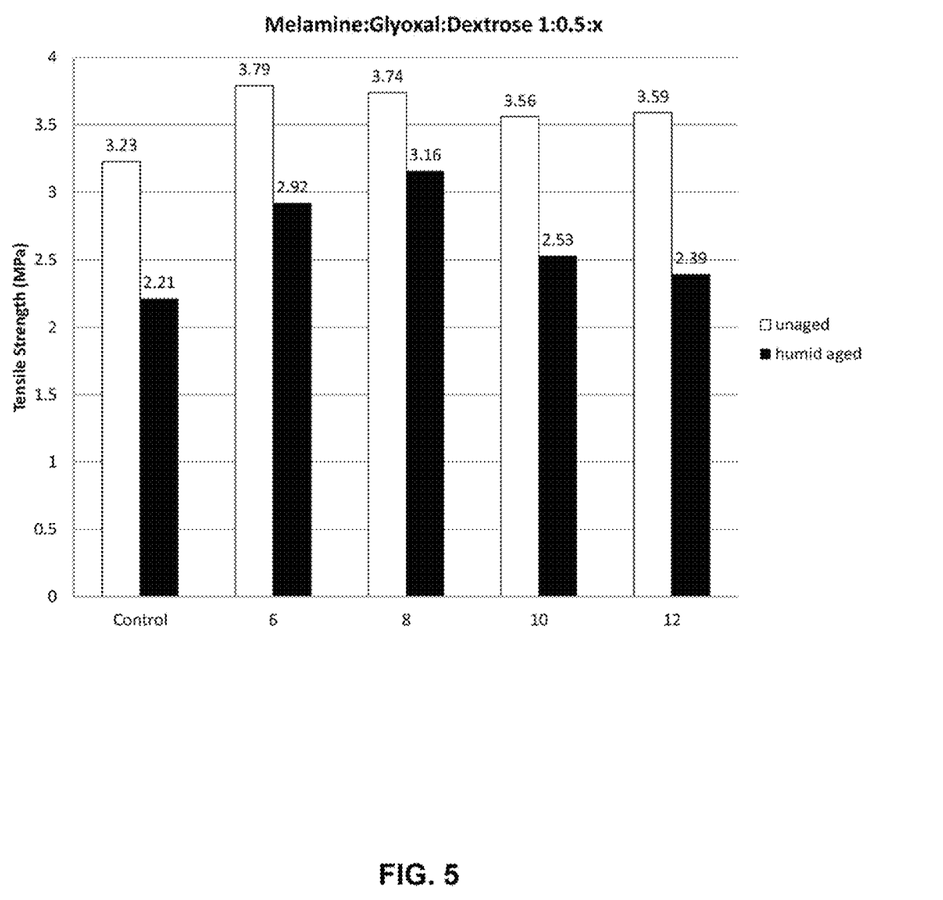
FIG. 5 shows a graph of tensile strength results for different mole ratios of dextrose according to embodiments of the present technology.

FIG. 5 shows the effect of the mole ratio of dextrose on the mechanical performance of dogbone glass composites made with melamine:glyoxal:dextrose at mole ratios of 1:0.5:x, where x varies from 6 to 12. The control was a resin based on urea:glyoxal:dextrose at 1:1:5. As can be seen from these results, the level of dextrose can be varied without a significant effect on the unaged and humid aged performance of the resin.

EXAMPLE 5

Figure 6:
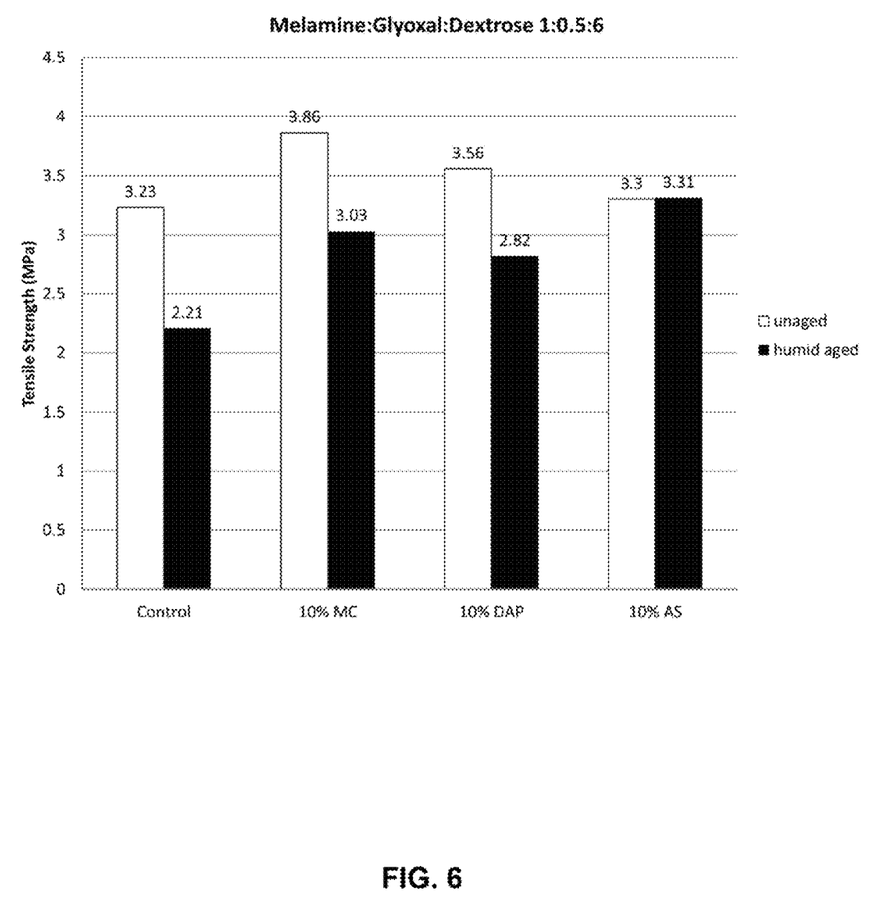
FIG. 6 shows the effect of different catalysts on the performance of dogbone composites according to embodiments of the present technology.

FIG. 6 shows the effect of different catalysts at 10% by mass of the solid resin on the performance of dogbone composites. The control was a resin based on urea:glyoxal:dextrose at 1:1:5. The best result was observed was observed with the 10% MC catalyst, which was a 1:1 mixture of AS (ammonium sulfate) and DAP (diammonium phosphate). Although DMA did not show much difference in the cure kinetics in the presence of different catalysts, MC had the best mechanical performance.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Additionally, details of any specific embodiment may not always be present in variations of that embodiment or may be added to other embodiments.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither, or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the curing catalyst" includes reference to one or more curing catalysts and equivalents thereof known to those skilled in the art, and so forth. The invention has now been described in detail for the purposes of clarity and understanding. However, it will be appreciated that certain changes and modifications may be practice within the scope of the appended claims.

What is claimed is:

1. A method of making a formaldehyde-free binder composition, the method comprising:
    dissolving melamine in an aqueous solution of a reducing sugar, wherein a concentration of the reducing sugar is 30 wt. % to 70 wt. % of the aqueous solution, and the temperature of the aqueous solution is 50° C. to 100° C.;
    adding a non-carbohydrate aldehyde or ketone to the dissolved melamine in the aqueous solution to form a binder solution, wherein the temperature of the aqueous solution of the dissolved melamine is 50° C. to 100° C. during the addition of the non-carbohydrate aldehyde or ketone; and
    reducing a temperature of the binder solution to about 23° C.

2. The method of claim 1, wherein the method further comprises maintaining a temperature of the binder solution at 80° C. to 100° C. for about 60 minutes to 120 minutes after adding all of the non-carbohydrate aldehyde or ketone.

3. The method of claim 1, wherein the method further comprises adding a curing catalyst to the binder solution.

4. The method of claim 3, wherein the curing catalyst is chosen from a sulfate salt, a phosphate salt, a borate salt, or combinations thereof.

5. The method of claim 3, wherein the adding of the curing catalyst comprises adding a 10 wt. % aqueous solution of ammonium sulfate, diammonium phosphate, or a combination of ammonium sulfate and diammonium phosphate in a 1:1 mole ratio.

6. The method of claim 3, wherein a mole ratio of the melamine to the reducing sugar is 1:3 to 1:12.

7. The method of claim 1, wherein the reducing sugar comprises dextrose.

8. The method of claim 1, wherein the non-carbohydrate aldehyde or ketone is chosen from acetaldehyde, butyraldehyde, alkoxylated acetaldehyde, glutaric dialdehyde, acetone, methyl ethyl ketone, or pentanedione.

9. The method of claim 1, wherein the non-carbohydrate aldehyde or ketone comprises glyoxal.

10. The method of claim 9, wherein a mole ratio of the melamine to the glyoxal is 2:1 to 1:3.

* * * * *